(12) United States Patent
Bois et al.

(10) Patent No.: US 10,125,630 B2
(45) Date of Patent: Nov. 13, 2018

(54) FAN DISK FOR A JET ENGINE AND JET ENGINE

(71) Applicant: SAFRAN AIRCRAFT ENGINES, Paris (FR)

(72) Inventors: Stephane Bois, Solers (FR); Arnaud Accary, Bourg la Reine (FR); Claude Dejaune, Boissise la Bertrand (FR); Benjamin Kiener-Calvet, Alforville (FR); Julien Foll, Lucy (FR); Alexandre Tan-Kim, Savigny le Temple (FR); Benjamin Petard, Paris (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 240 days.

(21) Appl. No.: 14/782,863

(22) PCT Filed: Mar. 28, 2014

(86) PCT No.: PCT/FR2014/050743
§ 371 (c)(1),
(2) Date: Oct. 7, 2015

(87) PCT Pub. No.: WO2014/167209
PCT Pub. Date: Oct. 16, 2014

(65) Prior Publication Data
US 2016/0069207 A1    Mar. 10, 2016

(30) Foreign Application Priority Data
Apr. 9, 2013  (FR) ..................................... 13 53177

(51) Int. Cl.
*F01D 5/14*  (2006.01)
*F01D 21/04*  (2006.01)
(Continued)

(52) U.S. Cl.
CPC ........... *F01D 21/045* (2013.01); *F01D 5/025* (2013.01); *F04D 29/321* (2013.01);
(Continued)

(58) Field of Classification Search
CPC .......... F01D 21/045; F01D 5/025; F01D 5/02; F01D 5/021; F04D 29/321; F04D 29/329;
(Continued)

(56) References Cited

U.S. PATENT DOCUMENTS 5,067,877 A * 11/1991 Youssef .................. F01D 5/326
                                                    416/220 R
5,112,193 A *  5/1992 Greer .................... F01D 5/3015
                                                    416/220 R
(Continued)

FOREIGN PATENT DOCUMENTS

EP         1 970 537         9/2008

OTHER PUBLICATIONS

Warren C. Young, Richard G. Budynas, "Roark's formulas for stress and strain", 1989, McGraw-Hill Companies, Inc., 7th Edition, pp. 52-54, 797.*

(Continued)

*Primary Examiner* — Logan Kraft
*Assistant Examiner* — Brian Delrue
(74) *Attorney, Agent, or Firm* — Oblon, McClelland, Maier & Neustadt, L.L.P.

(57) ABSTRACT

A fan disk is for a jet engine in which there flows a gas stream in a flow direction. A pin-shaped radial section of the fan disk includes a first branch, designed to be fixed to a drive shaft of the jet engine, a second branch, extending opposite the first branch and designed to support a plurality of fan blades, and a curved junction wall that extends between the first branch and the second branch.

12 Claims, 3 Drawing Sheets

(51) Int. Cl.
   *F01D 5/02*   (2006.01)
   *F04D 29/32*  (2006.01)
(52) U.S. Cl.
   CPC ...... *F04D 29/329* (2013.01); *F05D 2220/323* (2013.01); *F05D 2220/36* (2013.01); *F05D 2240/60* (2013.01)
(58) Field of Classification Search
   CPC ............... F04D 29/263; F04D 29/646; F05D 2220/323; F05D 2220/36; F05D 2240/60
   USPC .................................................. 416/244 A
   See application file for complete search history.

(56) References Cited

U.S. PATENT DOCUMENTS

| | | | | |
|---|---|---|---|---|
| 6,390,775 B1* | 5/2002 | Paz | ............................ | F01D 5/14 |
| | | | | 416/193 A |
| 6,761,536 B1* | 7/2004 | Bash | ........................ | F01D 5/18 |
| | | | | 416/193 A |
| 6,951,447 B2* | 10/2005 | Cherolis | ................ | F01D 5/141 |
| | | | | 416/193 A |
| 7,121,803 B2* | 10/2006 | Gautreau | ................... | F01D 5/26 |
| | | | | 29/889.1 |
| 7,153,102 B2* | 12/2006 | Stone | ........................ | F01D 5/02 |
| | | | | 416/219 R |
| 7,165,944 B2* | 1/2007 | Gautreau | ................... | F01D 5/16 |
| | | | | 416/219 R |
| 7,252,481 B2* | 8/2007 | Stone | ........................ | F01D 5/02 |
| | | | | 416/239 |
| 7,452,188 B2* | 11/2008 | Bouchard | ............... | F01D 5/066 |
| | | | | 416/204 R |
| 8,287,241 B2* | 10/2012 | Strohl | ..................... | F01D 5/141 |
| | | | | 416/190 |
| 8,408,446 B1* | 4/2013 | Smoke | .................. | B23P 15/006 |
| | | | | 228/193 |
| 9,151,168 B2* | 10/2015 | Jablonski | .............. | F01D 5/3007 |
| 9,169,730 B2* | 10/2015 | Barnett | ..................... | F01D 5/14 |
| 9,359,905 B2* | 6/2016 | Lamicq | ................. | F01D 5/3007 |
| 9,441,494 B2* | 9/2016 | Marlin | .................... | F01D 5/323 |
| 9,810,076 B2* | 11/2017 | Barnett | ..................... | F01D 5/30 |
| 2006/0275129 A1* | 12/2006 | Snook | ................... | F01D 5/3007 |
| | | | | 416/219 R |
| 2008/0063529 A1* | 3/2008 | Miller | ..................... | F01D 5/147 |
| | | | | 416/193 A |
| 2008/0226458 A1* | 9/2008 | Pierrot | .................... | F01D 5/323 |
| | | | | 416/220 R |
| 2008/0260535 A1* | 10/2008 | Mohr | .................... | F01D 5/3007 |
| | | | | 416/219 R |
| 2009/0282678 A1* | 11/2009 | Williams | ................ | B23P 6/002 |
| | | | | 29/889.1 |
| 2012/0275921 A1* | 11/2012 | Steen | ..................... | F01D 5/025 |
| | | | | 416/204 R |
| 2017/0074107 A1* | 3/2017 | Neville | ................. | F01D 5/3007 |

OTHER PUBLICATIONS

International Search Report dated Jun. 3, 2014 in PCT/FR14/50743 Filed Mar. 28, 2014.
International Search Report dated Jun. 3, 2014 in PCT/FR2014/050743 (with English translation of categories of cited documents).
French Preliminary Search Report dated Jan. 15, 2014 in Application No. FR1353177 (with English translation of categories of cited documents).

* cited by examiner

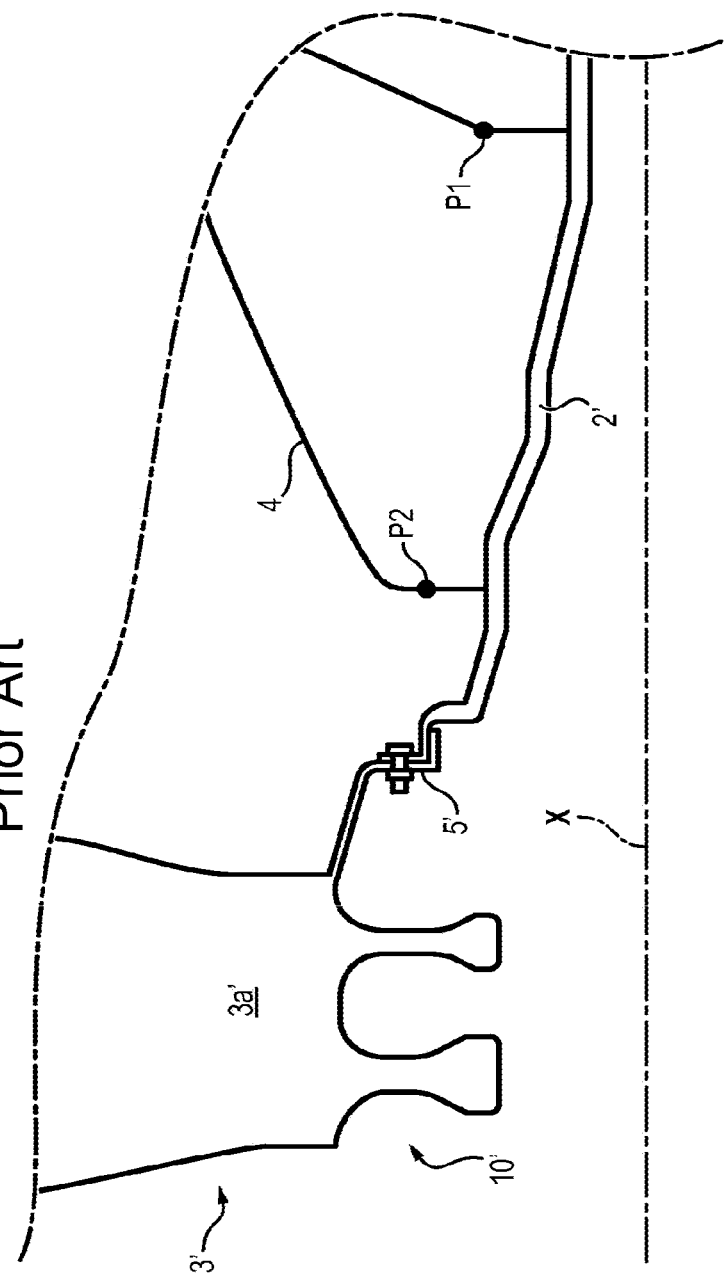

FAN DISK FOR A JET ENGINE AND JET ENGINE

FIELD OF THE INVENTION

The invention relates to the field of turbomachinery, and more particularly the field of turbojet engines including a fan integral with a drive shaft.

TECHNOLOGICAL BACKGROUND

A turbojet engine 1 typically comprises a nacelle which forms an opening for admission of a predetermined flow of air toward the engine itself. The turbojet includes one or more sections for compressing the air admitted into the engine (generally one low-pressure section 2 and one high-pressure section). The air thus compressed is admitted into a combustion chamber and mixed with fuel before being burned there. The hot combustion gases derived from this combustion are then expanded in different turbine stages (generally a low-pressure section and a high-pressure section).

One example of a fan 3' and of a low-pressure compressor 2 conforming to the prior art are illustrated in FIG. 3.

The fan 3' comprises a fan disk 10' provided with blades 3a' on its periphery which, when they are placed in rotation, drive air into the turbojet. The fan disk 10' is supported by a drive shaft of the low-pressure compressor 2', which is centered on the axis of the turbojet by a series of bearings, supported by support parts connected to the fixed structure of the turbojet.

The low-pressure compressor 2', for its part, comprises fixed vanes integral with a partition casing and movable blades integral with a drive drum 4 (known to persons skilled in the art as a "booster") to compress the primary flow circulating from upstream to downstream in the turbojet. The drive drum 4 is for example fixed upstream of the fan disk 10' by means of a bolted connection, and is driven in rotation by the fan disk 10' about the axis of the turbojet.

The fan disk must consequently ensure the operability of the drive drum, that is be sufficiently flexible to guarantee maintaining the drive drum in position and control its radial behavior to ensure the tip clearances of the blades, while being sufficiently rigid to satisfy the fan blade loss criterion (or "fan blade out").

Indeed, breakage of a fan blade 3a can result accidentally during operation. There follows a considerable unbalance on the drive shaft 2 of the fan 3, which generates loads and vibrations on the bearings, transmitted by their support parts to the fixed structure of the turbojet.

In order to be able to dimension the structure of the turbojet in a lighter and less costly fashion, the prior art teaches, as for example in patents FR 2,831,624 and FR 2,752,024, to provide for a turbojet 1 to be decoupled, including a system for decoupling one or more bearings. This, upon the appearance of an unbalance on the drive shaft, the unbalance forces are converted into longitudinal forces by the support part of the bearing. However, the fan disk being fixed to the drive shaft through a bolted flange 5', the loads which pass into the fan disk and into the drive shaft then become very large at the connection in the event of decoupling. Such attachment by bolting is then not sufficiently rigid to withstand the loads which would result from the fan blade out.

It has also been proposed to modify the shape of the fan disk. Nevertheless, these shapes are generally bulky and heavy and/or do not allow flexibility and rigidity constraints required to both ensure operability of the drive drum and resist loads.

Document US 2012/0275921 proposes a fan disk conforming to the preamble of claim 1. However, the configuration of this disk has considerable bulk and mass. Document EP 1 970 537, for its part, which is in the Applicant's name, describes a fan disk having a junction wall extending radially with respect to an axis of the turbojet. However, this orientation of the junction wall has the consequence of concentrating the loads in a localized area of the fan disk, which limits the ability to withstand the loads of the disk, particularly during the fan blade out.

SUMMARY OF THE INVENTION

One objective of the invention is to propose a fan disk which is sufficiently flexible to ensure the operability of the drive drum, while being sufficiently rigid to withstand the loads resulting from the loss of one or more fan blades, while having reduced bulk and mass, even in the case of a turbojet including a decoupling system.

To this end, the invention proposes a fan disk for a turbojet wherein a flow of gas circulates in one circulation direction, characterized in that it has a radial section in the form of a pin including:
  a first branch, designed to be fixed to a drive shaft of the turbojet,
  a second branch, extending facing the first branch and designed to support a plurality of fan blades, and
  a curved junction wall, extending between the first branch and the second branch.

This pin shape makes it possible to make the connection between the fan disk and the upstream portion of the drive line more flexible and to improve the dynamic operation of the assembly during an incident, such as a fan blade out. This leads, in this case, to a considerable reduction in the loads in the downstream structures of the turbojet and to a significant reduction in the radial displacements of the fan disk.

Certain preferred but not limiting characteristics of the fan disk are the following:
  the first branch includes an inner shroud of which one inner face is provided with a series of fan splines, said fan splines being designed to cooperate with associated drive splines of the drive shaft,
  the inner shroud further includes a centering assembly positioned to cooperate with an associated centering assembly of the drive shaft so as to improve the resistance of the first branch to radial loads,
  an upstream edge in the gas circulation direction of the inner shroud is offset axially with respect to an upstream edge of the second branch and the junction wall extends between the upstream edge of the inner shroud and the upstream edge of the second branch,
  the junction wall has a varying radial section that is inclined upstream between the first branch and the second branch,
  the radial section of the junction wall is curved in one area adjacent to the second branch, the concavity of the curve being oriented downstream in the gas circulation direction,
  the second branch includes a recess extending in an inner face at its junction with the junction wall,
  the fan disk further includes an indentation in an upstream face in the gas circulation direction, at the junction between the second branch and the junction wall, so that the upstream face of the fan disk has a circumferential inflection line between the indentation and the junction wall, and the fan disk further includes a disassembly and holding lug extending radially inwardly from the junction wall, configured to cooperate with a nut fixed to the drive shaft so as to block the fan disk axially.

The invention also proposes a turbojet including a drive shaft and a fan disk as described above, fixed to the drive shaft through its first branch and designed to receive a plurality of fan blades, the second branch of the fan disk being able to include a substantially smooth bore.

BRIEF DESCRIPTION OF THE DRAWINGS

Other features, aims and advantages of the present invention will be better revealed upon reading the detailed description hereafter, and with reference to the appended drawings given by way of non-limiting examples and wherein:

FIG. 3 is a schematic view in partial section of a turbojet conforming to the prior art.

DETAILED DESCRIPTION OF AN EMBODIMENT

Figure 1:
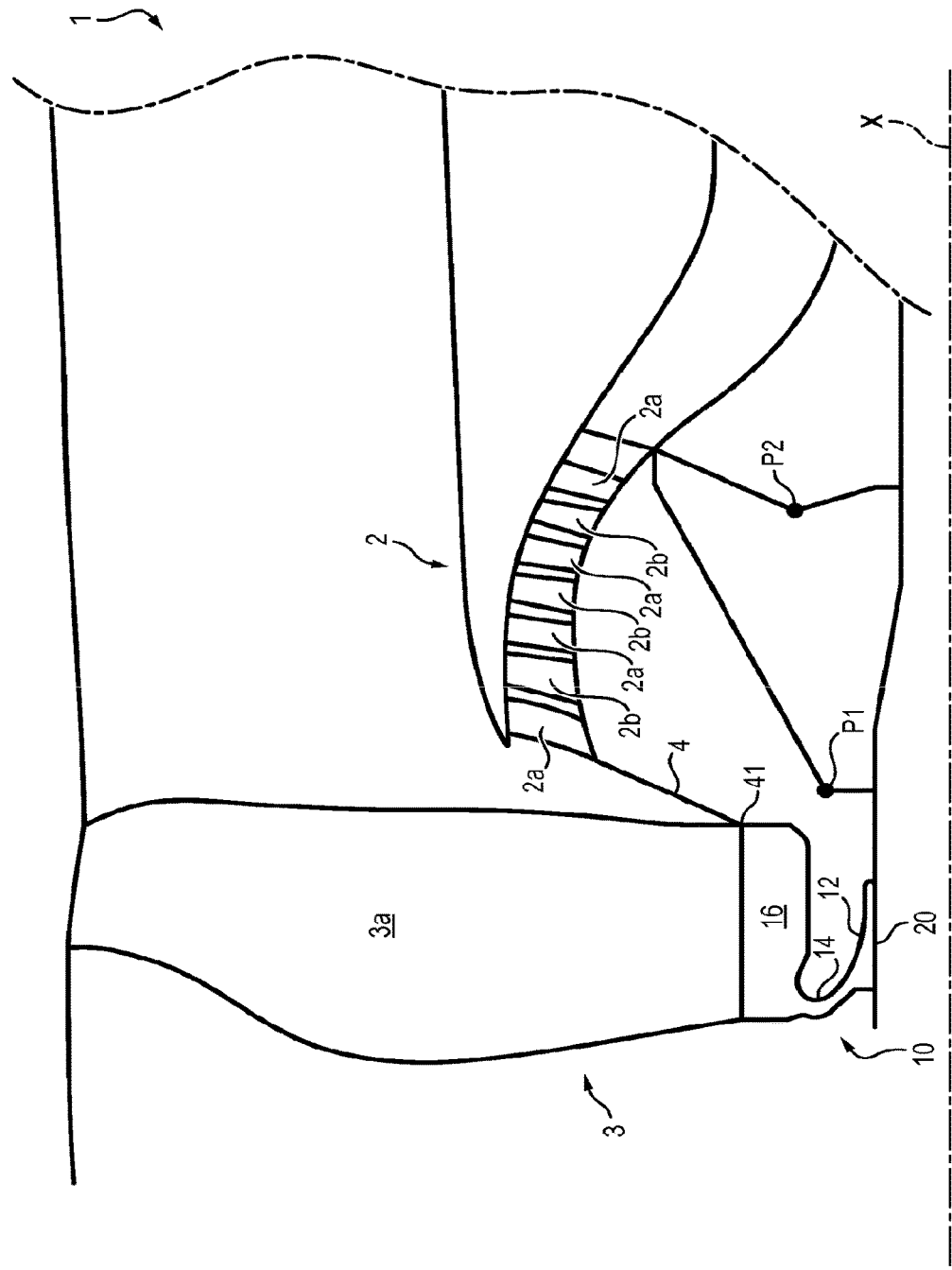
FIG. 1 is a schematic view in partial section of an example of a turbojet conforming to the invention.

A turbojet 1 includes, from upstream to downstream in the gas flow direction, a fan 3, on or more compressor stages 2, one or more turbine stages and a gas exhaust nozzle.

The fan 3 comprises a fan disk 10 provided with blades 3a on its periphery which, when they are placed in rotation, drive the air into the turbojet 1. The fan disk 10 is supported by the drive shaft 20 of the low-pressure compressor 2 which is centered on the turbojet axis 1 by a series of bearings P1, P2 supported by support parts connected to the fixed structure of the turbojet 1.

The low-pressure compressor 2, for its part, comprises fixed vanes 2a integral with a separation casing and movable blades 2b integral with a drive drum 4 (or "booster") to compress the primary flow circulating from upstream to downstream in the turbojet 1. The drive drum 4 is furthermore fixed to the fan disk 10 through a bolted connection 41 and is driven in rotation by the fan disk 10 about the axis of the turbojet 1.

The fan disk 10 is of a generally annular shape and has a radial section in the form of a pin including:

a first branch 12, designed to be fixed to the drive shaft 20 of the turbojet 1, a second branch 16, extending facing the first branch 12 and designed to support a plurality of fan blades 3a, and a curved junction wall 14, extending between the first branch 12 and the second branch 16.

This pin shape makes it possible to make the connection between the fan disk 10 and the upstream portion of the drive line more flexible and to improve the dynamic operation of the assembly during an incident, such as a fan blade out. This leads, in this case, to a considerable reduction in the loads in the downstream structures of the turbojet 1 and to a significant reduction in radial displacement of the fan disk 10.

The first branch 12 includes an internal shroud 121 centered on the axis of the turbojet 1, and the inner face whereof is designed to be fixed on the free upstream end of the drive shaft 20. To this end, the inner face of the inner shroud 121 is provided with a series of fan splines 122 extending longitudinally along the axis of the turbojet 1, designed to cooperate with drive splines 202 associated with the drive shaft 20.

The (drive 202 and fan 122) splines have the function of transmitting forces from the drive shaft 20 to the rest of the fan disk 10, so as to put the fan disk 10 into rotation, and to drive the fan blades 3a as well as the drive drum 4 (booster). They make it possible therefore to stiffen the first branch 12 of the fan disk 10 to ensure transmission of the torque between the drive shaft 20 and the fan disk 10, and constitute a solid connection capable of supporting the loads resulting from a fan blade out. Indeed, such a connection by splines 202, 122 is stronger that a bolted connection, so that the fan disk 10 better withstands the loads linked to a possible fan blade out.

In order to improve the strength of the first branch 12 against radial loads (with respect to the axis X), the turbojet 1 can further include members for centering the inner shroud 121 with respect to the drive shaft 20, configured to hold the shroud 121 in radial position on the drive shaft 20. The centering members can in particular include a downstream centering assembly 123, 203 and/or an upstream centering assembly 124, 204. The downstream centering assembly can include an annular boss 203, extending radially from the drive shaft 20 in an area adjacent a downstream end of the drive splines 202, on which rests a downstream edge 123 of the inner shroud 121. The upstream centering assembly, for its part, can include an annular groove 204 centered on the axis X and formed in the drive shaft 20 in an area adjacent to an upstream end of the drive splines 202, configured to accommodate an associated rib 124 protruding radially from an upstream edge 125 of the inner shroud 121.

The turbojet 1 can further include a nut 22, configured to be fixed to the drive shaft 20 so as to hold the inner shroud 12 in position axially with respect to the drive shaft 20. For example, the nut 22 can be placed in abutment against the rib 124 protruding from the upstream centering assembly 124, 204, and apply an axial force to said rib 124. Optionally, an adjusting wedge 24 can then be placed against the rib 124 and the drive splines 202, so as to adjust the axial position of the inner shroud 121 depending on the blade tip clearances of the drive drum 4.

The fan disk 10 can further include an annular lug 18, extending radially inwardly from the junction wall 14 in the direction of the drive shaft 20 so as to rest on the nut, the lug 18 being configured to avoid disengagement of the fan disk 10 and the nut 22 in the event of a fan blade out. For example, the lug 18 can extend from the upstream face 141 of the junction wall 14, in an area adjacent to the inner shroud 121. Here the lug 18 is adjacent to the rib 124 protruding from the upstream centering assembly 124, 204. Advantageously, the lug 18 makes it possible in addition to facilitate disassembly of the fan disk 10 with respect to the drive shaft 20.

The splines 122, 202, the centering members 123, 203, 124, 204 and the nut 22 therefore form a splined connection assembly capable of withstanding transverse loads (rotation about the axis X), respectively radial and axial.

The second branch 16 of the fan disk 10, or ring, is adapted to receive and hold in position a plurality of fan blades 3a, extending radially from an outer face of the ring 16.

Generally, the fan blades 3a are made of a metallic material which makes them relatively massive and often requires the implementation of one or more balancing systems (known by the name of "leeks") extending radially from an inner face of the ring 16 and configured to compensate the centrifugal force applied by the metal blades to the fan disk 10.

However, in order to reduce the overall mass of the fan 3, the fan blades 3a of the turbojet 1 are less massive than conventional metal blades. For example, the fan blades 3a can be made of a composite material. Advantageously, the boring of the ring 16 can then be generally smooth (that is without such balancing systems). The balancing systems are in fact no longer necessary, because the centrifugal forces resulting from the rotation of the blades 3a are smaller, which makes it possible to reduce considerably the bulk of the fan disk 10. Thus, the implementation of less massive fan blades 3a such as blades made of composite materials, makes it possible to compensate for the bulk linked with the splined connection.

The fan disk 10 with a radial section in the form of a pin further includes a curved junction wall 14, designed to connect the inner shroud 121 and the ring 16. The first branch 12, the junction wall 14 and the second branch 16 are preferably formed integrally in a single piece.

The junction wall 14 is of annular shape and is centered on the axis X of the turbojet 1. Its radial section is inclined upstream between the first branch 12 and the second branch 16 and forms a nonzero angle with a radial direction, perpendicular to the axis X. Such a junction wall 14 thus makes the fan disk 10 flexible between the ring 16 and the inner shroud 121, which makes it possible to ensure the operability of the drive drum 4.

In the exemplary embodiment illustrated in the figures, the junction wall 14 extends between an area adjacent to the upstream edge 125 of the inner shroud 121 and an area adjacent to the upstream edge 161 of the ring 16. More precisely, here the upstream edge 125 of the inner shroud 121 is axially offset with respect to the upstream end 161 of the ring 16 along the axis X of the turbojet 1, so that the junction wall 14 extends in an inclined manner between the upstream edge 125 of the inner shroud 121 and the upstream edge 161 of the ring 16.

The radial section of the junction wall 14 is further varying, that is not constant, between the inner shroud 121 and the ring 16, so as to withstand centrifugal and bending loads. For example, the radial section of the junction wall 14 can be substantially straight between the inner shroud 121 and an intermediate area of the junction portion 14 which is adjacent to the ring 16, then become curved in an area 143 adjacent to the ring 16, the concavity of the curve 143 being oriented downstream.

The inner face 162 of the ring 16 can include a recess 163 delimited by a wall which extends in alignment with the concave downstream face 142 of the junction wall 14, so that at the junction between the junction wall 14 and the ring 16 the fan disk 10 has a pocket with a generally rounded shape. This recess thus allows the mass of the fan disk 10 to be reduced, without however creating weak areas or reducing the mechanical strength of the fan disk 10. It can be obtained directly by casting with the rest of the fan disk 10, or by machining in the inner face of the ring 16.

Figure 2:
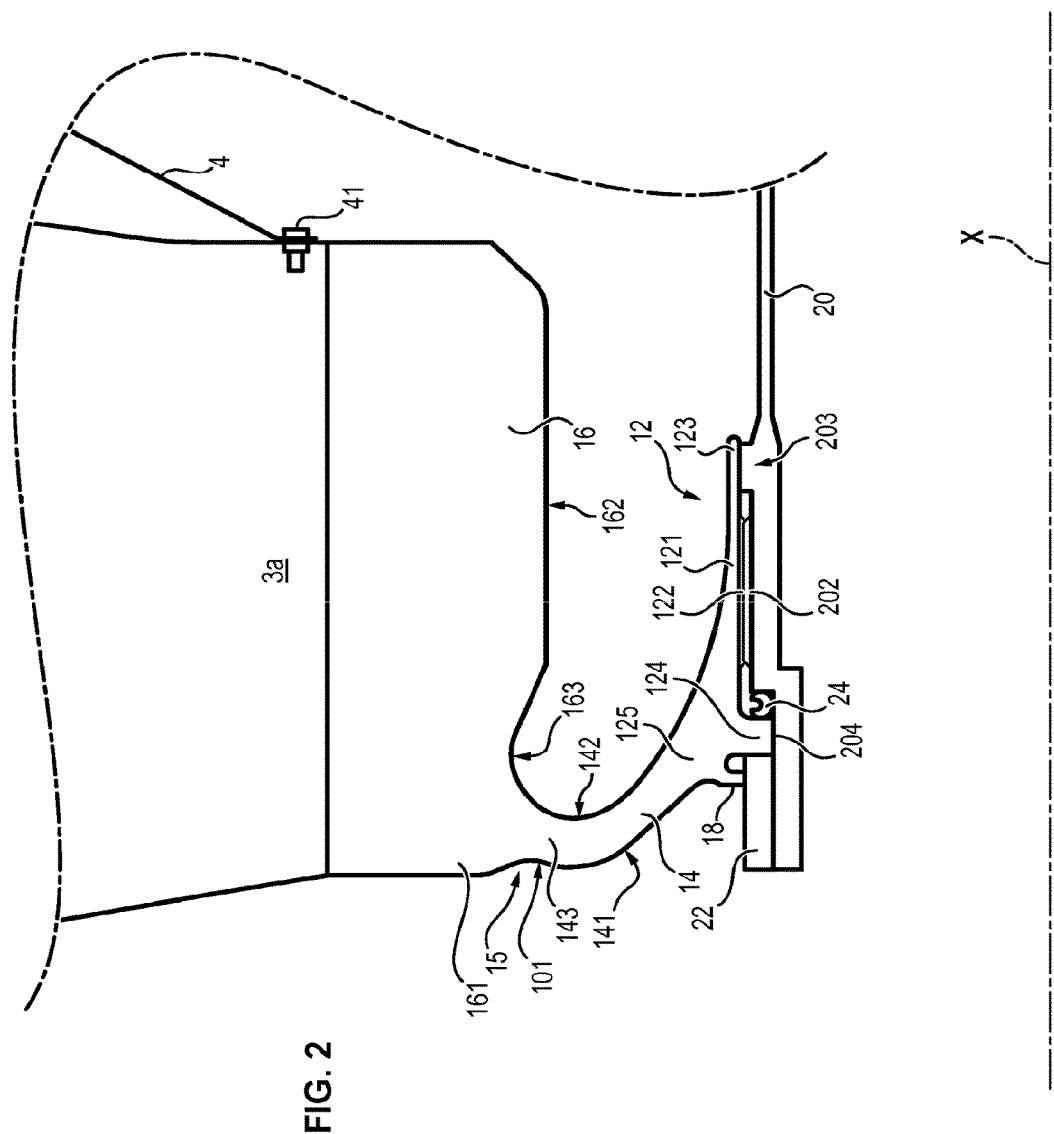
FIG. 2 is a schematic view in partial section of the fan disk of FIG. 1.

Moreover, the upstream face 101 of the fan disk 10 can include an indentation 15 at the junction between the ring 16 and the junction wall 14. Given that the junction wall 14 is inclined between the inner shroud 121 and the ring 16, the upstream face 101 of the fan disk 10 consequently has a circumferential inflection line between the indentation 15 and the junction wall 14, which leads to a change in concavity. Thus, in the embodiment of FIG. 2, the indentation 15 is curved and continuous, with a concavity oriented upstream. It can be obtained directly by casting with the rest of the fan disk 10, or by machining in the upstream face 101 of the fan disk 10.

Such an indentation 15 makes it possible to optimize the forces in the event of a fan blade out, by making the fan disk 10 locally flexible, and improves the distribution of forces. Moreover, the indentation 15 makes it possible to dissociate the tangential forces in the ring 16 from the bending forces in the junction wall 14 and to thus limit any additional buckling which would be connected with biaxial forces.

In order to better resist the centrifugal and bending loads, the thickness of the fan disk 10 is preferably variable between the inner shroud 12 and the ring 16. In the embodiment illustrated in FIG. 2, the radial thickness of the fan disk 10 is thin at the support area of the downstream edge 123 of the inner shroud 12 on the annular boss 203. The fan disk 10 is therefore relatively flexible in this area 123, which allows it to be easily pressed onto the drive splines 122. The flexibility of this downstream edge 123 further improves the centering of the fan disk 10 with respect to the drive shaft 20.

The radial thickness of the fan disk 10 then increases in the direction of the upstream edge 125 of the inner shroud 121, up to the rib 124 and the lug 18 located at the junction between the inner shroud 121 and the junction wall 14. The upstream 141 and downstream 142 faces of the junction wall 14 are inclined radially outwardly toward the upstream side of the fan disk 10, and approach each other progressively in the direction of the ring 16 up to the curved portion 143 of the junction wall 14. Finally, at the curved portion 143, the junction wall 14 flares axially so as to form the indentation 15 upstream, and the recess 163 downstream. The ring 16, for its part, has a generally constant radial section between its upstream edge 161 and the recess 163.

The fan disk 10 is sufficiently rigid, thanks to its inner shroud 121 and the splined connection (splines 122, 202 and optionally the centering members and the nut 22), to transmit the torque from the drive shaft 20 to the fan blades 3a and to the drive drum 4, and to resist loads resulting from a possible fan blade out. Moreover, the implementation of a junction wall 14 that is varying and inclined with respect to the axis of the turbojet 1 makes it possible to confer on the disk 10 sufficient flexibility to ensure operability of the drive drum 4. Finally, the adjustment of the thickness of the junction wall 14, particularly at the indentation 15 or the recess 163, makes it possible to reduce the overall mass of the fan disk 10, and to optimize the forces in the fan disk 10.

The invention claimed is:

1. A fan disk for a turbojet engine wherein a gas circulates in a circulation direction, comprising:
   a radial section in the shape of a pin including:
      a first branch, designed to be fixed to a drive shaft of the turbojet engine,
      a second branch, extending facing the first branch and designed to support a plurality of fan blades, and
      a curved junction wall extending between the first branch and the second branch,
   wherein the second branch includes a recess extending in an inner face of the second branch, the recess is located at a junction between the second branch and the curved junction wall, and
   wherein the recess is located downstream of the curved junction wall, the junction comprises a downstream face, and the downstream face of the curved junction wall being concave.

2. The fan disk according to claim 1, wherein the first branch includes an inner shroud comprising an inner face, the inner face is provided with a series of fan splines, said fan splines being designed to cooperate with associated drive splines from the drive shaft.

3. The fan disk according to claim 2, wherein the inner shroud further includes a centering assembly arranged to cooperate with an associated centering assembly of the drive shaft so as to improve the resistance of the first branch to radial loads.

4. The fan disk according to claim 2, wherein an upstream edge in the gas circulation direction of the inner shroud is axially offset with respect to an upstream edge of the second branch, and the curved junction wall extends between the upstream edge of the inner shroud and the upstream edge of the second branch.

5. The fan disk according to claim 1, wherein the curved junction wall has a varying radial section inclined upstream between the first branch and the second branch.

6. The fan disk according to claim 5, wherein the varying radial section of the curved junction wall comprises a curve in an area adjacent to the second branch, the curve comprising a concavity oriented downstream in the gas circulation direction.

7. The fan disk according to claim 1, further including an indentation in an upstream face in the gas circulation direction, at the junction between the second branch and the curved junction wall, so that the upstream face of the fan disk has a circumferential inflection line between the indentation and the curved junction wall.

8. The fan disk according to claim 1, further including a disassembly and holding lug extending radially inwardly from the curved junction wall, configured to cooperate with a nut fixed to the drive shaft so as to axially block the fan disk.

9. The fan disk according to claim 1, wherein an upstream face of the second branch is further upstream than an upstream face of the curved junction wall in the gas circulation direction.

10. A turbojet engine comprising:
a drive shaft, and
the fan disk according to claim 1, the fan disk is fixed to the drive shaft by the first branch and designed to accommodate a plurality of fan blades.

11. The turbojet engine according to claim 10, wherein the second branch of the fan disk includes a substantially smooth bore.

12. A fan disk for a turbojet engine wherein a gas circulates in a circulation direction, comprising:
a radial section in the shape of a pin including:
a first branch, designed to be fixed to a drive shaft of the turbojet engine,
a second branch, extending facing the first branch and designed to support a plurality of fan blades, and
a curved junction wall extending between the first branch and the second branch,
wherein the second branch includes a recess extending in an inner face of the second branch, the recess is located at a junction between the second branch and the curved junction wall, and
wherein the fan disk further includes an indentation in an upstream face in the gas circulation direction, at the junction between the second branch and the curved junction wall, so that the upstream face of the fan disk has a circumferential inflection line between the indentation and the curved junction wall.

\* \* \* \* \*